(12) United States Patent  
Sanger et al.

(10) Patent No.: US 7,283,282 B2  
(45) Date of Patent: Oct. 16, 2007

(54) METHOD OF ADJUSTING COLOR IN A COLOR PROOF

(75) Inventors: Kurt M. Sanger, Rochester, NY (US); Seung Ho Baek, Pittsford, NY (US); Thomas A. Mackin, Hamlin, NY (US); Robert W. Spurr, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 1016 days.

(21) Appl. No.: 10/355,372

(22) Filed: Jan. 31, 2003

(65) Prior Publication Data

US 2004/0150842 A1 Aug. 5, 2004

(51) Int. Cl.  
G06F 15/00 (2006.01)  
B41J 2/00 (2006.01)

(52) U.S. Cl. .................... 358/1.9; 358/1.1; 347/196

(58) Field of Classification Search ............ 358/1.9, 358/504, 534, 523, 518, 530, 501, 1.1, 509; 382/267, 262; 347/3, 196, 252

See application file for complete search history.

(56) References Cited

U.S. PATENT DOCUMENTS

| | | | |
|---|---|---|---|
| 4,937,167 A * | 6/1990 | Moffat et al. | 430/137.12 |
| 5,255,085 A | 10/1993 | Spence | |
| 5,268,708 A | 12/1993 | Harshbarger et al. | |
| 5,293,539 A | 3/1994 | Spence | |
| 5,309,246 A | 5/1994 | Barry et al. | |
| 5,315,382 A * | 5/1994 | Tanioka | 358/523 |
| 5,655,062 A * | 8/1997 | Tompkins et al. | 358/1.9 |
| 5,825,377 A | 10/1998 | Gotoh et al. | |
| 5,862,434 A * | 1/1999 | Yamakawa | 399/54 |
| 5,917,996 A * | 6/1999 | Thorpe | 358/1.14 |
| 6,161,919 A * | 12/2000 | Klassen | 347/43 |
| 6,174,037 B1 * | 1/2001 | Donahue et al. | 347/9 |
| 6,312,101 B1 | 11/2001 | Couwenhoven et al. | |
| 6,609,776 B2 * | 8/2003 | Ames et al. | 347/15 |
| 6,873,347 B2 * | 3/2005 | Sasaki | 347/176 |
| 7,088,469 B1 * | 8/2006 | Sanger et al. | 358/1.9 |
| 7,108,898 B2 * | 9/2006 | Yoshinari | 428/32.77 |
| 2003/0227500 A1 * | 12/2003 | Sanger | 347/19 |
| 2004/0150844 A1 * | 8/2004 | Sanger | 358/1.9 |
| 2005/0123869 A1 * | 6/2005 | Shimomura et al. | 430/534 |
| 2005/0146557 A1 * | 7/2005 | Sato et al. | 347/40 |

FOREIGN PATENT DOCUMENTS

| | | |
|---|---|---|
| EP | 0 835 025 | 10/1998 |
| EP | 0 982 932 | 3/2000 |
| EP | 1 043 164 | 10/2000 |
| EP | 1 207 684 | 5/2002 |
| WO | 02/05545 | 1/2002 |

* cited by examiner

Primary Examiner—Madeleine A V Nguyen  
(74) Attorney, Agent, or Firm—Nelson Adrian Blish

(57) ABSTRACT

The present invention is a method of adjusting a color in a color proof (112) printed with primary colors cyan, magenta, yellow, and black. It is accomplished by:
  a) combining the cyan bitmap (2), magenta bitmap (4), yellow bitmap (6), and black bitmap (8) into one multi-bit image (202) and
  b) imaging each of the primary colorants with the multi-bit image (202).

15 Claims, 11 Drawing Sheets

(5 of 11 Drawing Sheet(s) Filed in Color)

METHOD OF ADJUSTING COLOR IN A COLOR PROOF

CROSS REFERENCE TO RELATED APPLICATIONS

Reference is made to commonly-assigned U.S. patent application Ser. No. 10/355,600, now U.S. Pat. No. 6,893,105, filed Jan. 31, 2003, entitled A METHOD FOR PRINTING AN IMAGE FROM A HALFTONE BINARY BITMAP USING MULTIPLE EXPOSURES, by Sanger et al.; U.S. patent application Ser. No. 10/355,932, filed Jan. 31, 2003, entitled APPARATUS FOR PRINTING A MULTIBIT IMAGE, by Sanger et al.; U.S. patent application Ser. No. 10/355,849, filed Jan. 31, 2003, entitled METHOD OF IMAGING MULTIPLE COLOR RECIPES IN A SINGLE PASS, by Sanger et al.; and U.S. patent application Ser. No. 10/356,006, filed Jan. 31, 2003, entitled METHOD FOR PRINTING A COLOR PROOF USING A SPATIAL FILTER, by Kurt M. Sanger, the disclosures of which are incorporated herein.

FIELD OF THE INVENTION

The present invention relates to a method for printing halftone color proofs from binary bitmap images and more specifically for combining binary bitmaps of the primary colors into one multi-bit image and exposing each primary color at multiple exposures to adjust the primary and overprint colors in the proof.

BACKGROUND OF THE INVENTION

Pre-press color proofing is a procedure used by the printing industry to create representative images of printed material. This procedure avoids the high cost and time required to produce printing plates and set-up a high-speed, high-volume printing press to produce a single intended image for proofing prior to a production run of the intended image. In the absence of pre-press proofing, a production run may require several corrections to the intended image to satisfy customer requirements, and each of the intended images would require a new set of printing plates. By utilizing pre-press color proofing, time and money are saved.

A laser thermal printer having halftone color proofing capabilities is disclosed in commonly-assigned U.S. Pat. No. 5,268,708 (Harshbarger et al.) The U.S. Pat. No. 5,268,708 device is capable of forming an image on a sheet of thermal print media by transferring dye from dye donor material to thermal print media. This is achieved by applying thermal energy to the dye donor material to form an image on the thermal print media. The apparatus disclosed comprises a material supply assembly; a lathe bed scanning subsystem, which includes a lathe bed scanning frame, a translation drive, a translation stage member, and a laser printhead; a rotatable vacuum imaging drum; and exit transports for the thermal print media and dye donor material.

The U.S. Pat. No. 5,268,708 apparatus meters a length of the thermal print media in roll form from a material supply assembly. The thermal print media is measured and cut into sheets of the required length, transported to the vacuum imaging drum, and wrapped around and secured to the vacuum imaging drum. Donor roll material is metered out of the material supply assembly, measured, and cut into sheets of the required length. A sheet of dye donor material is transported to and wrapped around the vacuum imaging drum, and superposed in registration with the thermal print media. The scanning subsystem traverses the printhead axially along the rotating vacuum imaging drum to produce the image on the thermal print media. The image is written in a single swath, traced out in a continuous spiral, concentric with the imaging drum, as the printhead is moved parallel to the drum axis.

The U.S. Pat. No. 5,268,708 apparatus simulates the printing process by imaging the dye donor material at a constant exposure. The dye donor is used to mark or not mark the thermal print media similar to the printing process, which either transfers or does not transfer ink. The apparatus allows the exposure to each dye donor material to be varied over a limited range to allow the customer to match the density of the of the dye deposited on the thermal print media with the density of the ink which will be used to print the image on a press.

Although the printer disclosed in U.S. Pat. No. 5,268,708 performs well, the primary colors cyan, magenta, yellow, and black may only be adjusted for solid area density. The color of the solid area densities is determined by the donor material. Once the density level for the primary colors is determined, the overprint density and color is fixed. For instance magenta overprint on top of cyan produces an overprint blue. Yellow overprint on top of cyan produces green, yellow overprint on top of magenta produces red. Setting the densities of the primary colors indirectly sets the densities of the overprint colors. The customer may set the density for one or the other but not both.

In the printer described by U.S. Pat. No. 5,268,708 many steps are required to calibrate. First, the exposure for each color plane is adjusted to match the solid area density. Second, the dot-gain for each color plane is adjusted to achieve a dot-gain match at different halftone tint levels. Third, the dot-gain curves and density levels may be fine-tuned to achieve either a good neutral match in the three-color overprints or a color match of the flesh tones. For some work other memory colors such as green grass or light blue sky may be matched as the critical color. Finally, the dot-gain curves may be further adjusted to deliver better performance in the highlight, or shadow areas. These steps are critical and typically take much iteration between the proof operator and the customer to achieve the look that the customer desires.

Color proofers create halftone bitmaps of cyan, magenta, yellow, and black color planes using a raster image processor (RIP). Customer artwork is composed into pages using software such as Quark Express™ or Adobe InDesign™. These pages may consist of color images, black and white images, artwork, linework, and text. Images may be continuous tone, multilevel, or binary. The pages may also contain PDF or PostScript codes. The RIP processes the input pages and creates halftone bitmap files for each color plane at the writing resolution of the printer. The RIP converts multilevel input, such as the pixels in a continuous tone image, into halftone dots of the appropriate size.

The conventional proofing solution, using a direct digital color halftone proofer, is to rip the file for proofing separate from ripping the file for printing, adding dot-gain to the proofing file as part of the ripping process. U.S. Pat. No. 5,255,085 (Spence) discloses a method to adjust the tone reproduction curve of a press or output printer. This method creates a target from the press or desired output proof, benchmarks the characteristics of the proofing device, and generates a lookup table to adjust the dot-gain of the original file to achieve the aim on the proofing device. U.S. Pat. No. 5,268,708 adds adaptive process values to interpolate between measured benchmark and aim data sets to calibrate the dot-gain tone-scale curve at other screen rulings, screen angles, and dot shapes in U.S. Pat. No. 5,293,539 (Spence).

Current direct digital color halftone proofers implement dot-gain by modifying the code values being printed through a curve prior to converting the code values into the halftone bitmap with the raster image processor (RIP). The dot gain is only applied to the continuous tone image data and not the line work or text. The dot gain may be adjusted for each of the primary colors cyan, magenta, yellow, and black. A dot gain curve may also be specified for spot colors orange, green, red, blue, white, and metallic. Once the dot gain curve is applied to the primary colors the dot gain of the overprint colors is fixed. Sometimes the dot gain curve of the primary colors is adjusted to correct the dot gain in the overprints. This results in a slight error in the tonescale of the primary color.

Another method to adjust the color and tonescale of the primary and overprint colors is through the use of a color transform and an ICC profile as defined by the International Color Consortium's "File Format for Color Profiles," Specification ICC.1A: 1999-04. The ICC profile specifies the conversion from the source image color space (typically RGB) to an intermediate CMYK color space. This conversion is then followed by a conversion from CMYK to CMYK cm preferably according to the method disclosed by U.S. Pat. No. 6,312,101 (Couwenhoven et al.) For digital halftone color proofers the use of ICC Profiles results in changes in the halftone dot size plus the addition or subtraction of halftone dots of primary colors. This produces acceptable proofs for small changes in halftone dot size. This method produces poor halftone proofs when additional color dots are added where there were none. Another disadvantage is when holes are added to solid areas. A third disadvantage is that the use of an ICC profile allows too much flexibility to the printer making it difficult for the customer to understand the additions or subtractions in the proof.

The printing industry also needs to be able to use colors other than the standard cyan, magenta, yellow, and black (CMYK) in pre-press color proofing. The CMYK colors are often referred to as process colors. In the printing industry additional colors, other than cyan, magenta, and yellow, are used depending upon the graphic designers intentions for the printed work. A "key" color may be added to highlight a particular component of the artwork. For screened continuous tone images this key color is typically chosen to be black. The image is modified to use black to adjust the intensity level within the image instead of using cyan, magenta, and yellow together. This is called under color removal. For some work, the customer may choose to use another color, for example, brown, as the key color. This may be appropriate, for example, on a cereal box or in an image with a tan subject. To print the job the printer uses cyan, magenta, yellow and the key color. To save money one or more of the colors may be eliminated. For artwork the printing industry may print the job with the exact inks used by the artist. In these cases the printer may be printing red, blue, or some combination of colors which may or may not include CMYK.

In many cases the color of the subject may not be successfully reproduced using the standard CMYK colorants. In this case an additional color printing plate may be created to be printed with an ink which is a close match to the desired color of the subject. This additional color is imaged with the CMYK layers and is called a "bump" plate. It is important to note that one or more of the process colors may be eliminated or replaced with the bump color. For instance if a red color is used to bump the color of a red car, then the black or cyan process color may be replaced with the red bump color.

In existing pre-press systems, additional donor colors would be needed to accomplish this. For example, commercial systems such as Polaroid Graphics Imaging Polaproof, Dupont Digital Halftone Proofing System, and Imation Matchprint Laser Proof Technology, have all advertised the availability of additional donor colorants to create digital halftone proofs with special colors. This solution, however, requires the manufacturer to produce additional dye donor sheet in special color, often in small volume. Small production runs like this, for one color, are expensive.

Another problem arises when plates in the printing press are out of register. In that case colors are imaged slightly wider and overlapped so that a white space error does not occur. The printing industry hides this defect by increasing the line width of a color such that errors in color placement are hidden behind the darker color. This technique is called "trapping." It is important to be able to see the trapping on each of the printed color planes in the halftone proof. The capability to show trapping is not readily available in state of the art pre-press color proofers without use of a special color dye donor sheet.

Printing presses traditionally use a halftone screen to generate tone scale. The printing process is only capable of delivering or not delivering ink, which is usually opaque. This is the binary printing process. To generate a light tint, small dots of ink are used. To generate a darker tint the ink dots are enlarged which touch and fill the space between dots. The halftone proofer disclosed in U.S. Pat. No. 5,268,708 images CMYK colorants at a high resolution. For example, a Kodak Approval XP system produces images at either 2400 dpi or 2540 dpi using a software raster image processor (RIP) to generate a bitmap which determines when the lasers within the printer mark the CMYK films. The colors are arranged in a grid and the halftone pitch, dot to dot, is called the screen ruling in dots per inch. The angle of the grid is called the screen angle. Each color is printed at a different screen angle to hide the beating, or aliasing, caused by the alignment and accuracy of the color screens to each other. For optimum conditions the cyan, magenta, and black screens are each separated by 30 degrees. The fourth color, yellow, is then placed at an angle half way between the angle of two of the other colors. Each color screen is separated out as a separate bitmap plane with a grid of pixels at the writing resolution of the digital halftone proofer. The software RIP determines the positions in the grid when the laser needs to be energized to print the halftone dot.

It is common practice in color proofing to represent special color planes, i.e. planes containing colors other than the processes colors, by replacing solid color areas with halftone patterns of the process colors as described for example in U.S. Pat. No. 5,309,246. It is usually necessary to attach additional instructions with these proofs to inform customers and printers that a substitution has been made. It is highly desirable for halftone color proofing systems to reproduce the special color planes with colors that more closely represent the final print job. In the case of laser thermal material transfer proofing systems it is well known that this can be accomplished by using individualized donors having the unique color required for the special color plane, however, this process adds additional expense as described above.

U.S. Pat. No. 5,309,246 (Barry et al.) generates special colors using separate screens of the primary components of the special color. These screens consists of halftone dots of different sizes in each of the primary colors to compose a "recipe" color and simulate the special color required in the proof. If the halftone screens of the recipe color are designed to run at a constant density of the primary color then they may be combined and run in one pass. Trapping would not be shown if they run in a single pass. The special color is obtained by modulated density using halftone dot size so that the halftone dot size of the written special color will not match the press. The advantage of U.S. Pat. No. 5,309,246 is that the halftone special color is a good approximation of the special color. The disadvantage of U.S. Pat. No. 5,309,246 is that an additional exposure pass is required to show trapping between special and primary colors.

U.S. Pat. No. 6,060,208 (Wang) simulates the special color by screening the special color, then modifying the screened bitmap by eliminating pixels so that when the modified bitmap is imaged with the printer's primary color less density is printed and the resulting proof looks like it has been imaged with an additional special colorant. The method of U.S. Pat. No. 6,060,208 also produces a halftone image of the special color. However, the method of U.S. Pat. No. 6,060,208 has noticeable holes within the special color halftone dots on the proof. For cases where a small amount of pixels are subtracted or a few number of pixels are added, the method of U.S. Pat. No. 6,060,208 is similar to U.S. Pat. No. 5,309,246. With the method of U.S. Pat. No. 6,060,208 the special color bitmap may be combined with the primary color bitmap so that the primary color is imaged in a single pass. However, the exposure for this pass is a constant, and the density transferred per micro-pixel is also a constant. If the printer resolution is high enough to see each individual micro-pixel in the image then the method of U.S. Pat. No. 6,060,208 is visible in the halftone proof. If the printer resolution is lower than the writing resolution then the missing or additional micro-pixels are blurred in the image and the method of U.S. Pat. No. 6,060,208 is modulating the density in the halftone proof identical to U.S. Pat. No. 5,309,246. When a few micro-pixels are added or subtracted from the primary color then the method of U.S. Pat. No. 6,060,208 produces pleasing results. However, when a small amount of primary color is required then using a few micro-pixels at a fixed density does a poor job creating a halftone screen of the special color. This is described by U.S. Pat. No. 5,309,246 et al. as adding a small halftone dot of one color to a larger halftone dot of a second color to achieve a third color.

Commonly-assigned copending U.S. patent application Ser. No. 09/535,671, filed Mar. 23, 200 describes a method of imaging a special color using multiple primary colors at unique exposures to mix different amounts of primary colors on the halftone proof. U.S. patent application Ser. No. 09/535,671 uses a single binary bitmap for each of the colors in the special color. The disadvantage of U.S. patent application Ser. No. 09/535,671 is that an additional exposure pass is required for imaging each additional colorant within the special color.

Color proofers may use both laser power and drum speed to adjust the exposure for each colorant. A drum speed increment of 25 RPM allows running close to the maximum laser power most of the time thereby increasing print throughput. Color proofers image one bitmap at one exposure per pass. The high writing resolution and the small spot size, approximately 25 μm, are used to simulate center weighted halftone dots and text that are normally imaged on a printing press. Printing special colors using multiple exposures of the primary colors requires additional exposures passes. These extra passes take more time and lower the throughput of the digital halftone proofer.

Thus, there exists methods today to proof special colors using cyan, magenta, yellow, and black colorants. These methods take additional time. Plus there is a need to be able to adjust the overprint and primary densities and color of the proof.

SUMMARY OF THE INVENTION

Briefly, according to one aspect of the present invention, a method for adjusting a color in a color proof printed with primary colors cyan, magenta, yellow, and black is accomplished by the following steps a) combining a cyan binary bit map, a magenta binary bitmap, a yellow binary bitmap, and a black binary bitmap to form an image comprising 4-bits per pixel;

b) using the 4-bit per pixel image to identify colors selected from a group which includes red, cyan, green, magenta blue, yellow, and neutral; and c) for each of the primary colors, perform the following steps in sequence:

1) loading a color donor selected from the group of primary colors;

2) setting a density for the loaded color donor for an amount of color donor in each the selected colors;

3) calculating a set of exposures needed to image the density;

4) setting a maximum exposure level which is a number greater than or equal to a maximum for the set of exposures;

5) calculating a pulse width modulation level for the set of exposures using said set maximum exposure level; and 6) printing the color donor at said set maximum exposure level using the pulse width modulation level for each level of the 4-bit per pixel image in a single pass.

According to one embodiment, the present invention relates to a method for printing halftone color proofs from binary bitmap images. More specifically, the present invention is for logically combining binary bitmaps of the primary colors into multiple bitmaps and imaging these bitmaps using adjustable amounts of the primary colors to adjust the primary and overprint colors in the proof.

The present invention also relates to a method for printing halftone color proofs from binary bitmap images and more specifically for logically combining binary bitmaps of the primary colors into one multi-bit image and exposing each primary color at unique multiple exposures to adjust the primary and overprint colors in the proof.

Specifically the method relates to creating special color bitmaps for each of the overprint colors, special color bitmaps for the pure colors, and the original bitmaps and imaging all of the bitmaps using recipe colors and a digital halftone color proofer. In addition the method combines the cyan, magenta, yellow, and black halftone bitmaps into one 4-bit per pixel image and images the 4-bit per pixel image using each primary color at multiple exposures to adjust the overprint and primary colorants.

It is an advantage of the present invention that the overprint densities and color may be adjusted separately from the primary colors.

It is an advantage of the present invention that the primary colors may also be adjusted by adding additional amounts of each primary color to each other.

It is an advantage of the present invention that the color of the paper may be tinted using adjustable amounts of the primary colors.

It is an advantage of the present invention that each primary color may be imaged in a single exposure pass.

BRIEF DESCRIPTION OF THE DRAWINGS

The patent or application file contains at least one drawing executed in color. Copies of this patent or patent application publication with color drawings will be provided by the Office upon request and payment of the necessary fee.

DETAILED DESCRIPTION OF THE INVENTION

Figure 1:
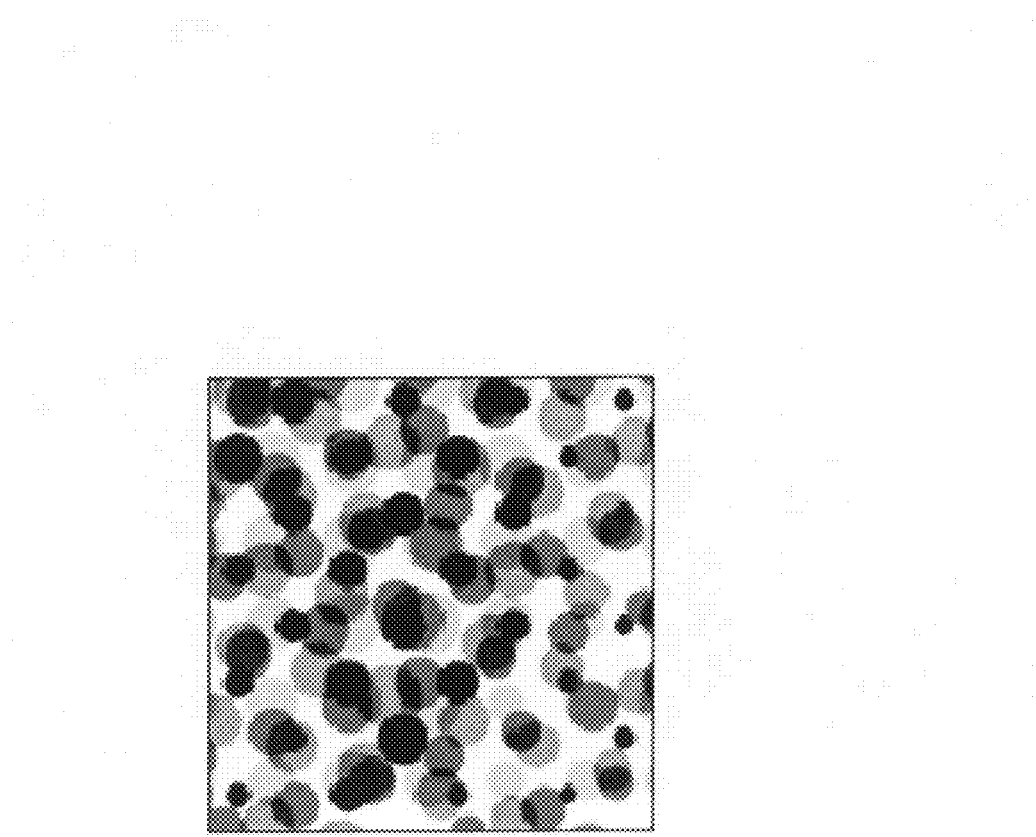
FIG. 1 is a four color halftone image.

The invention has been described in detail with particular reference to certain preferred embodiments thereof, but it will be understood that variations and modifications can be effected within the spirit and scope of the invention. For the sake of discussion, but not limitation, the preferred embodiment of the present invention will be illustrated in relation to a laminating apparatus for making pre-press proofs. Referring to the drawings wherein like reference numerals represent identical or corresponding parts throughout the several views.

Figure 2:
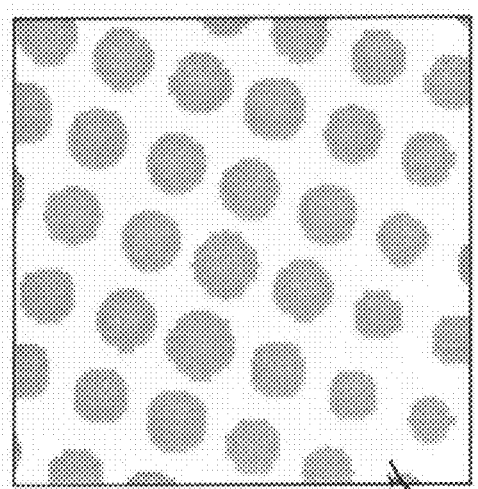
FIG. 2 is the cyan separation or bitmap.
Figure 3:
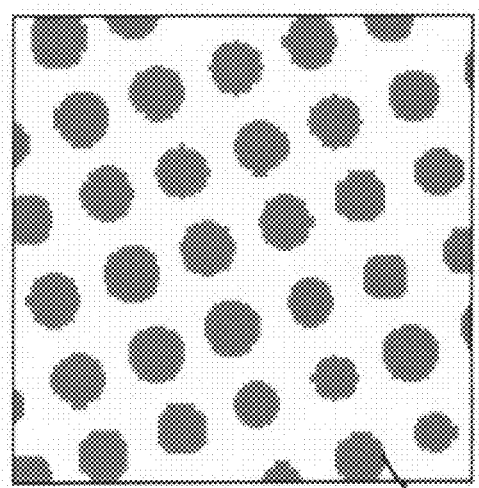
FIG. 3 is the magenta separation or bitmap.
Figure 4:
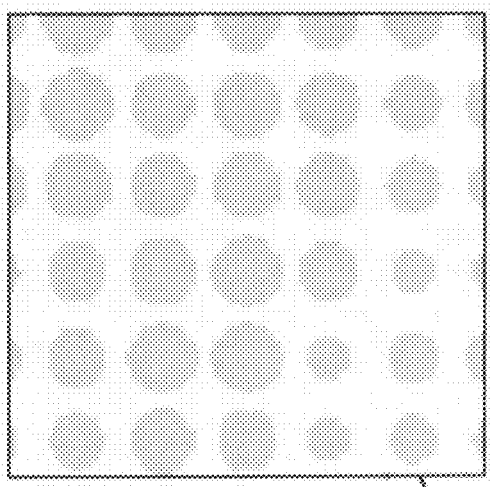
FIG. 4 is the yellow separation or bitmap.
Figure 5:
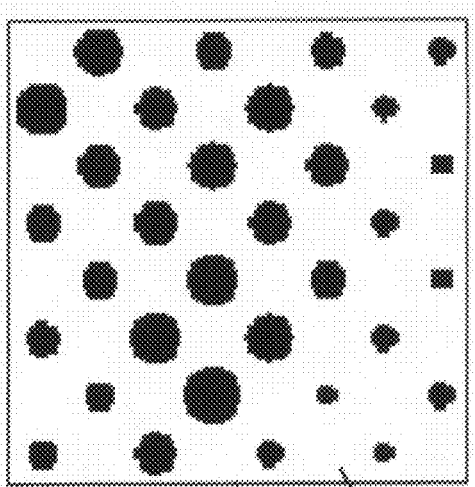
FIG. 5 is the black separation or bitmap.

A four color halftone image as shown in FIG. 1 consists of a cyan, magenta, yellow and black (CMYK) separation. A bitmap for each separation is created by the raster image processor (RIP) when printed on a digital halftone color proofer such as a digital halftone proofer. The cyan, magenta, yellow, or black bitmap can be images, text, bar codes, and linework. The cyan bitmap 2 for the cyan separation is shown in FIG. 2. The bitmap for the magenta bitmap 4 for the magenta separation is shown in FIG. 3. The yellow bitmap 6 for the yellow separation is shown in FIG. 4. The black bitmap 8 for the black separation is shown in FIG. 5.

Figure 6:
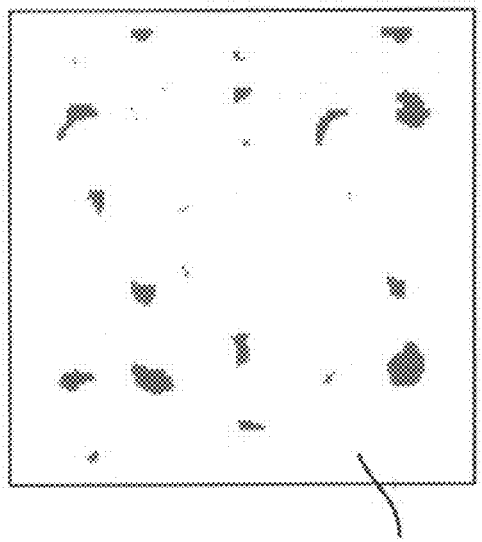
FIG. 6 is a red bitmap.

The invention calculates a red bitmap 10 similar to FIG. 6 computed by the logical AND of the yellow bitmap 6 and the magenta bitmap 4. Note in the present invention the logical AND is used for the positive sense where a pixel marks the film when it is a logical "1" or on level and does not mark the film when it is a logical "0" or off level. If the opposite sense were used, i.e. a "0" level is marks the film, then the red bitmap is formed by the logical OR of the yellow bitmap 6 and the magenta bitmap 4.

Figure 7:
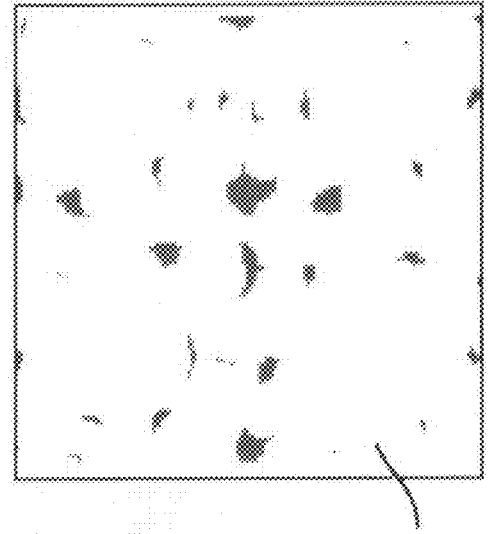
FIG. 7 is a green bitmap.

The invention calculates a green bitmap 12 similar to FIG. 7 computed by the logical AND of the yellow bitmap 6 and the cyan bitmap 2.

Figure 8:
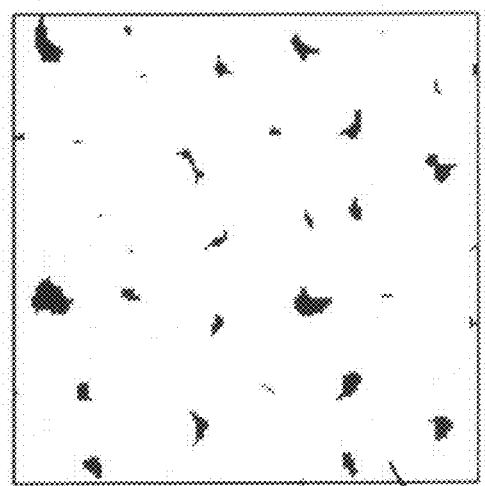
FIG. 8 is a blue bitmap.

The invention calculates a blue bitmap 14 similar to FIG. 8 computed by the logical AND of the magenta bitmap 4 and the cyan bitmap 2.

The invention creates a halftone digital proof using the cyan bitmap 2 at a cyan density level, the magenta bitmap 4 at a magenta density level, the yellow bitmap 6 at a yellow density level, the black bitmap 8 at a black density level, the red bitmap 10 at a red recipe consisting of one or more of the set of (cyan, magenta, yellow, and black densities), the green bitmap 12 at green recipe consisting of one or more of the set of (cyan, magenta, yellow, and black densities), and the blue bitmap 14 at a blue recipe consisting of one or more of the set of (cyan, magenta, yellow, and black densities). The red, green, and blue recipes allow for the addition of colorant to the red, green, and blue overprint areas. This allows for the overprint colors to be changed independent of the primary colorant density level.

A second embodiment of the invention anticipates that less primary colorant may be required in an overprint area than in the primary colors. The second embodiment calculates a red bitmap 10 shown in FIG. 6 computed by the logical AND of the yellow bitmap 6 and the magenta bitmap 4 and the inverse cyan bitmap 2 and the inverse black bitmap 8. Note in the invention disclosure the logical AND is used for the positive sense where a pixel marks the film when it is a logical "1" or on level and does not mark the film when it is a logical "0" or off level.

The invention calculates a green bitmap 12 shown in FIG. 7 computed by the logical AND of the yellow bitmap 6 and the inverse magenta bitmap 4 and the cyan bitmap 2 and the inverse of the black bitmap 8.

The invention calculates a blue bitmap 14 shown in FIG. 8 computed by the logical AND of the inverse yellow bitmap 6 and the magenta bitmap 4 and the inverse of the cyan bitmap 2 and the inverse of the black bitmap 8.

Figure 10:
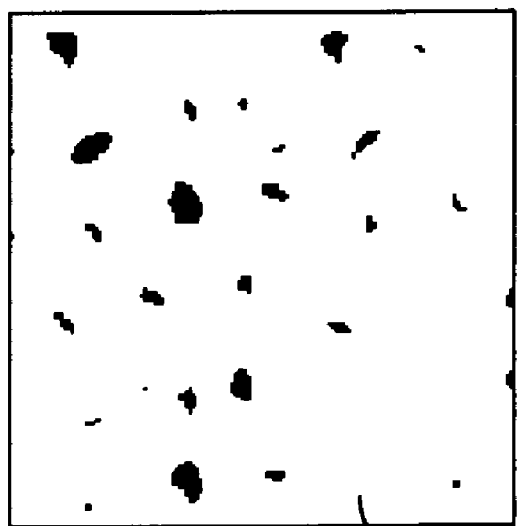
FIG. 10 is a three color black or neutral bitmap.

The invention calculates a three color black or neutral bitmap 16 shown in FIG. 10 computed by the logical AND of the yellow bitmap 6 and the magenta bitmap 4 and the cyan bitmap 2 and the inverse of the black bitmap 8.

Figure 11:
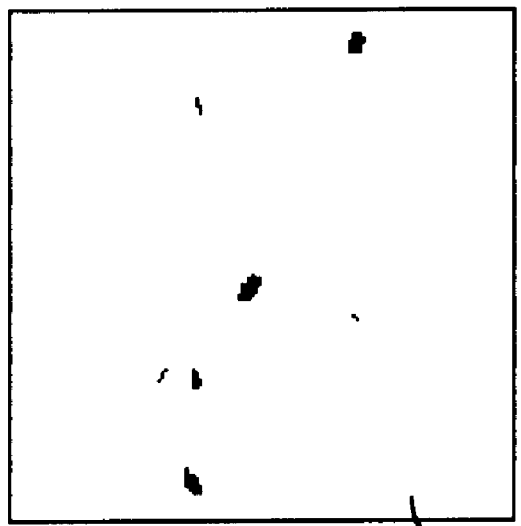
FIG. 11 is a four color black bitmap.

The invention calculates a four color black bitmap 18 shown in FIG. 11 computed by the logical AND of the yellow bitmap 6 and the magenta bitmap 4 and the cyan bitmap 2 and the black bitmap 8.

Figure 12:
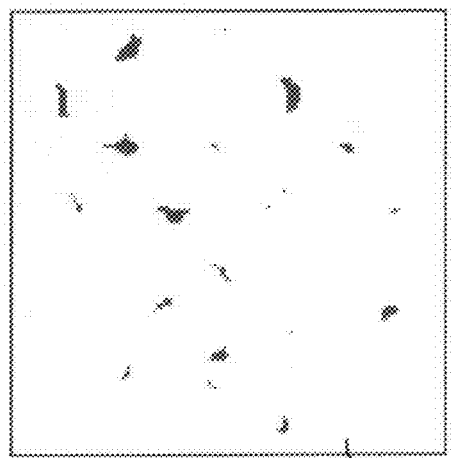
FIG. 12 is a dark cyan bitmap.

The invention calculates a dark cyan bitmap 20 shown in FIG. 12 computed by the logical AND of the inverse yellow bitmap 6 and the inverse magenta bitmap 4 and the cyan bitmap 2 and the black bitmap 8.

Figure 13:
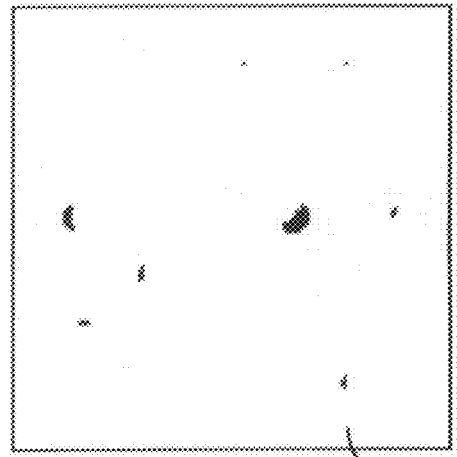
FIG. 13 is a dark magenta bitmap.

The invention calculates a dark magenta bitmap 22 shown in FIG. 13 computed by the logical AND of the inverse yellow bitmap 6 and the magenta bitmap 4 and the inverse cyan bitmap 2 and the black bitmap 8.

Figure 14:
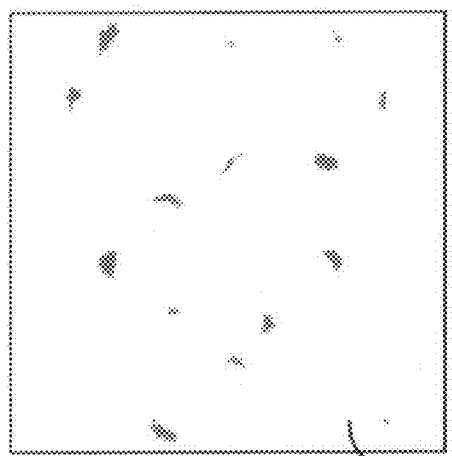
FIG. 14 is a dark yellow bitmap.

The invention calculates a dark yellow bitmap 24 shown in FIG. 14 computed by the logical AND of the yellow bitmap 6 and the inverse magenta bitmap 4 and the inverse cyan bitmap 2 and the black bitmap 8.

Figure 15:
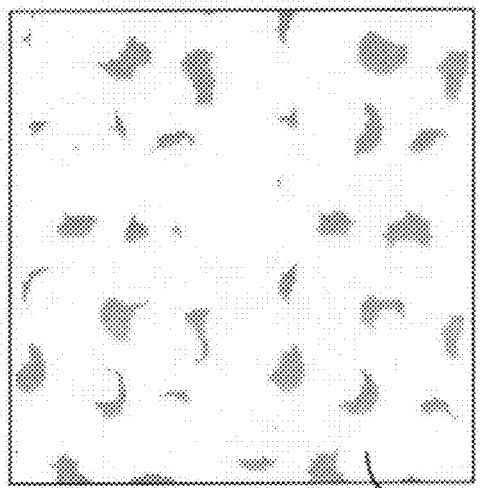
FIG. 15 is a pure cyan bitmap.

The invention calculates a pure cyan bitmap 26 shown in FIG. 15 computed by the logical AND of the inverse yellow bitmap 6 and the inverse magenta bitmap 4 and the cyan bitmap 2 and the inverse black bitmap 8.

Figure 16:
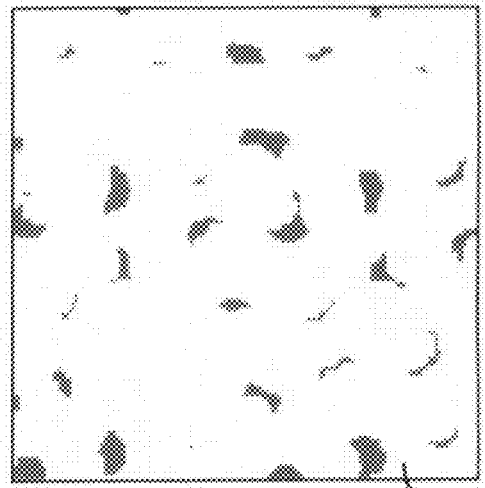
FIG. 16 is a pure magenta bitmap.

The invention calculates a pure magenta bitmap 28 shown in FIG. 16 computed by the logical AND of the inverse yellow bitmap 6 and the magenta bitmap 4 and the inverse cyan bitmap 2 and the inverse black bitmap 8.

Figure 17:
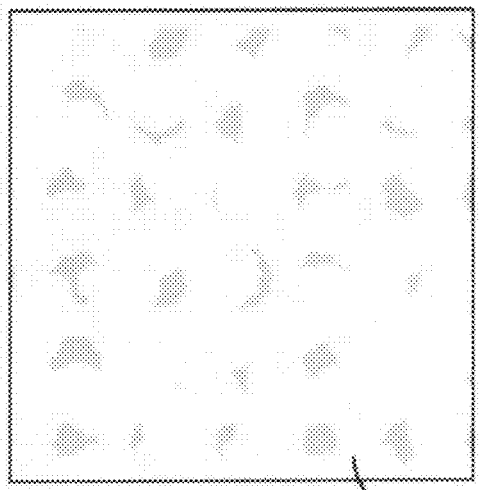
FIG. 17 is a pure yellow bitmap.

The invention calculates a pure yellow bitmap 30 shown in FIG. 17 computed by the logical AND of the yellow bitmap 6 and the inverse magenta bitmap 4 and the inverse cyan bitmap 2 and the inverse black bitmap 8.

Figure 18:
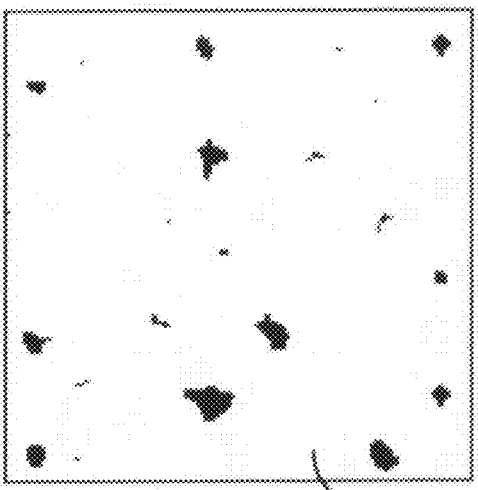
FIG. 18 is a pure black bitmap.

The invention calculates a pure black bitmap 32 shown in FIG. 18 computed by the logical AND of the inverse yellow bitmap 6 and the inverse magenta bitmap 4 and the inverse cyan bitmap 2 and the black bitmap 8.

The invention creates a halftone digital proof using:
a) the pure cyan bitmap 26 at a cyan density level;
b) the pure magenta bitmap 28 at a magenta density level;
c) the pure yellow bitmap 30 at a yellow density level;
d) the pure black bitmap 32 at a black density level;
e) the red bitmap 10 at a red recipe consisting of one or more of the set of (cyan, magenta, yellow, and black densities);
f) the green bitmap 12 at green recipe consisting of one or more of the set of (cyan, magenta, yellow, and black densities);
g) the blue bitmap 14 at a blue recipe consisting of one or more of the set of (cyan, magenta, yellow, and black densities);
h) the dark cyan bitmap 20 at a dark cyan recipe, consisting of one or more of the set of (cyan, magenta, yellow, and black densities);
i) the dark magenta bitmap 22 at a dark cyan recipe, consisting of one or more of the set of (cyan, magenta, yellow, and black densities);
j) the dark yellow bitmap 24 at a dark cyan recipe, consisting of one or more of the set of (cyan, magenta, yellow, and black densities);
k) the three color black or neutral bitmap 16 at a 3K recipe, consisting of one or more of the set of (cyan, magenta, yellow, and black densities); and
l) the four color black bitmap 18 at a 4K recipe, consisting of one or more of the set of (cyan, magenta, yellow, and black densities).

The invention allows for the pure primary colorant density to be less than, greater than, or equal to the density component in an overprint containing the primary color.

The invention allows for the pure primary color bitmaps to be imaged with a recipe instead of a single color component.

The invention allows for the use of the original primary color bitmap to be used in addition or in place of one of the calculated bitmaps. This allows for the elimination of white space error between bitmap separations. For instance if the red bitmap 10, the pure yellow bitmap 30, and the pure magenta bitmap 28 are imaged in an area on the print with a registration error between each of the bitmaps then there may exist a white space error between yellow, red, and magenta areas on the proof. An embodiment of the invention eliminates the white space error by using the original yellow bitmap 6 in place of either the pure yellow bitmap 30 or the red bitmap 10 when imaging yellow. The original magenta bitmap 4 is used in place of either the pure magenta bitmap 28 or the red bitmap 10 when imaging magenta.

The method steps for using an original primary color bitmap are as follows:
a) to image cyan:
1) find the bitmap (CLIGHTEST) with the lightest cyan density (CMIN) among the set of densities for the group (pure cyan, blue recipe, green recipe, dark cyan, 3K, 4K);
2) substitute the original cyan bitmap 2 for the bitmap CLIGHTEST with the lightest cyan density CMIN;
3) image the original bitmap at the lightest cyan density CMIN; and
4) image each of the remaining bitmaps in the group (pure cyan, blue recipe, green recipe, dark cyan, 3K, 4K) less the bitmap CLIGHTEST at their corresponding density levels less the lightest cyan density CMIN;
b) to image magenta:
1) find the bitmap (MLIGHTEST) with the lightest magenta density (MMIN) among the set of densities for the group (pure magenta, blue recipe, red recipe, dark magenta, 3K, 4K);
2) substitute the original magenta bitmap 4 for the bitmap MLLIGHTEST with the lightest magenta density MMIN;
3) image the original bitmap at the lightest magenta density MMIN; and
4) image each of the remaining bitmaps in the group (pure magenta, blue recipe, red recipe, dark magenta, 3K, 4K) less the bitmap MLIGHTEST at their corresponding density levels less the lightest magenta density MMIN;
c) to image yellow:
1) Find the bitmap (YLIGHTEST) with the lightest yellow density (YMIN) among the set of densities for the group (pure yellow, blue recipe, green recipe, dark yellow, 3K, 4K);
2) substitute the original yellow bitmap 6 for the bitmap YLIGHEST with the lightest yellow density YMIN;
3) Image the original bitmap at the lightest yellow density YMIN; and
4) image each of the remaining bitmaps in the group (pure yellow, blue recipe, green recipe, dark yellow, 3K, 4K) less the bitmap YLIGHTEST at their corresponding density levels less the lightest yellow density YMIN;
d) to image black:
1) find the bitmap (KLIGHTEST) with the lightest black density (KMIN) among the set of densities for the group (pure black, dark cyan recipe, dark magenta recipe, dark yellow, 3K, 4K);
2) substitute the original black bitmap 8 for the bitmap KLIGHTEST with the lightest black density KMIN;
3) image the original bitmap at the lightest black density KMIN; and
4) Image each of the remaining bitmaps in the group (pure black, dark cyan recipe, dark magenta recipe, dark yellow, 3K, 4K) less the bitmap KLIGHTEST at their corresponding density levels less the lightest yellow density KMIN.

Figure 19:
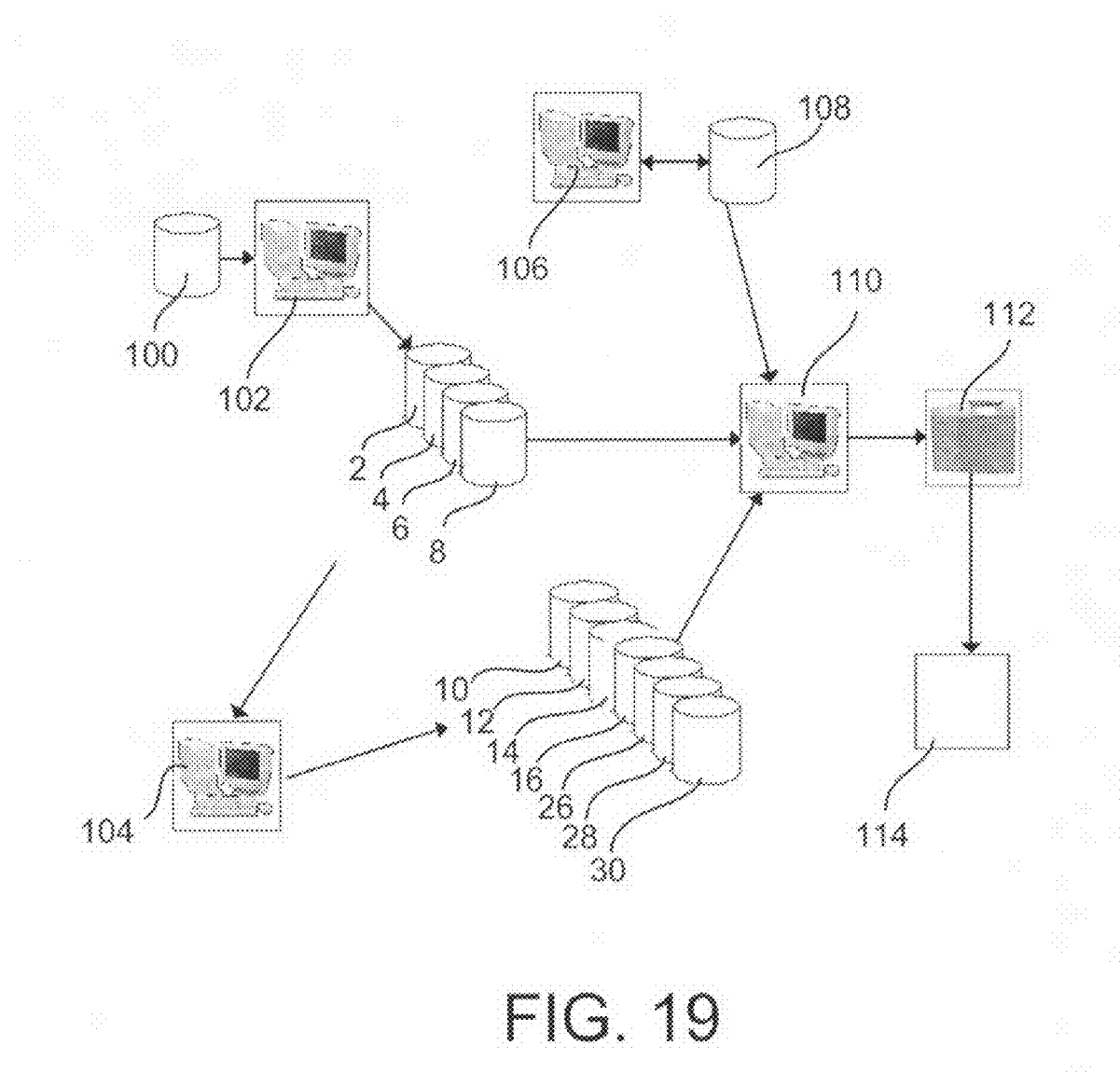
FIG. 19 is an embodiment of the invention.

FIG. 19 is an embodiment of the invention. A continuous tone image resides in a postscript file on disk 100 is read by a Harlequin raster image processor (RIP) software program residing on computer 102. The Harlequin RIP creates the cyan bitmap separation 2, magenta bitmap separation 4, yellow bitmap separation 6, and black bitmap separation 8. Normally digital halftone color proofer 112 such as a Kodak Approval XP would image these separations in each of cyan, magenta, yellow, and black to produce the halftone proof 114. In this embodiment a custom "C" program residing on computer 104 reads the cyan bitmap 2, magenta bitmap 4, yellow bitmap 6 and black bitmap 8 and creates the logical combinations resulting in a red bitmap 10, green bitmap 12, blue bitmap 14, three color black or neutral bitmap 16, pure cyan bitmap 26, pure magenta bitmap 28, and pure yellow bitmap 30. In this example the printer colorants are cyan, magenta, yellow, and black.

In this embodiment the logical combinations are as follows:
1) Red bitmap=magenta bitmap AND yellow bitmap;
2) Green bitmap=yellow bitmap AND cyan bitmap;
3) Blue bitmap=cyan bitmap AND magenta bitmap;
4) Three color black or neutral bitmap=cyan bitmap AND magenta bitmap AND yellow bitmap;
5) Pure cyan bitmap=cyan bitmap AND (NOT magenta bitmap) AND (NOT yellow bitmap);
6) Pure magenta bitmap=(NOT cyan bitmap) AND magenta bitmap AND (NOT yellow bitmap); and
7) Pure yellow bitmap=(NOT cyan bitmap) AND (NOT magenta bitmap) AND yellow bitmap.

A program called Approval Configuration Utility (ACU) residing on computer 106 is used to enter the recipes for each of the colors in the set (cyan, magenta, yellow, black, three color black or neutral, red, green, blue, pure cyan, pure magenta, and pure yellow), storing the recipes on disk 108. A program called Approval Interface Toolkit (AIT) residing on computer 110 reads the recipes from disk 108 and imports the bitmaps (2, 4, 6, 8, 10, 12, 14, 16, 26, 28, 30) to create a print job residing on computer 110. The print job is sent to printer 112 which is a direct digital color halftone proofer which images the primary colors (cyan, magenta, yellow, and black) in combination with the bitmaps (2, 4, 6, 8, 10, 12, 14, 16, 28, 30) to create halftone proof 114. The software Harlequin RIP, ACU, AIT, and the printer Kodak Approval XP are available from Kodak Polychrome Graphics of Norwalk Conn. The Harlequin RIP is also available separately from Global Graphics located in the United Kingdom.

Figure 20:
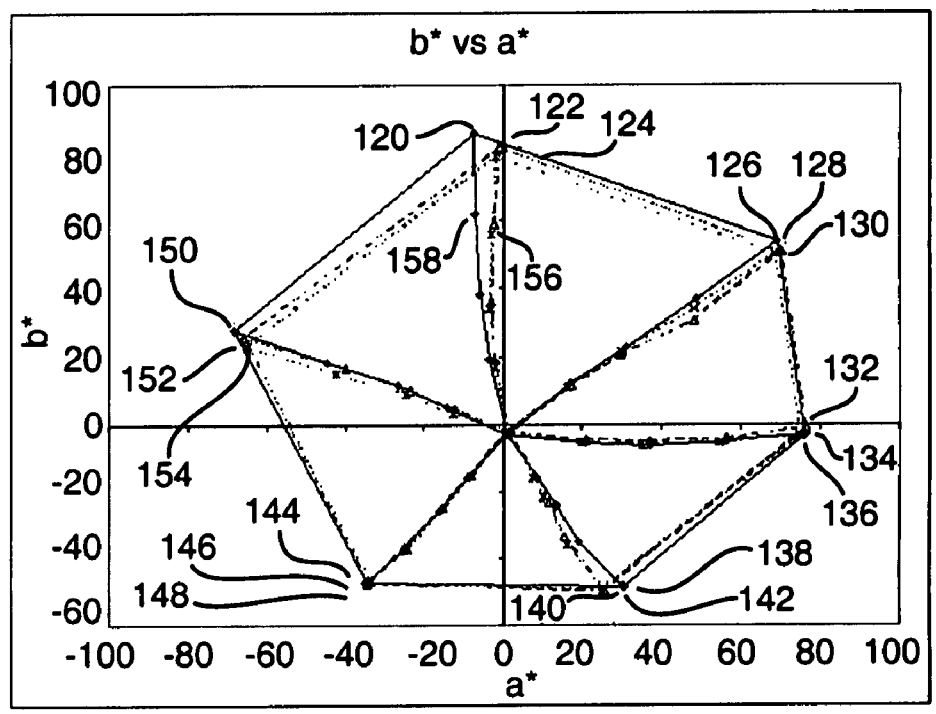
FIG. 20 is a graph of printed color with and without the invention.

FIG. 20 is an A* verses B* plot showing the color with and without the invention. Color of printed patches is measured with a Gretag Spectromat spectrometer using cieLAB color-space. Patches are created in each of the primary colors and overprints using 0%, 25%, 50%, 75%, and 100% halftone dots. Note there is no black in the patches tested. Without the invention we imaged Cyan at 1.35 Status T Cyan Density, magenta at 1.45 Status T Magenta Density, and yellow at 0.85 Status T Yellow Density. Without the invention the A* and B* measurements are shown as:
1) Yellow 120;
2) Red Overprint 126;
3) Magenta 132;
4) Blue Overprint 138;
5) Cyan 144; and
6) Green Overprint 150.

Using the invention without the original bitmaps we imaged the following. Pure cyan at 1.3 cyan, pure magenta at 1.45 magenta, pure yellow at 0.85 yellow plus 0.15 magenta, red at 1.5 magenta and 0.75 yellow, green at 1.3 cyan and 0.15 magenta and 0.85 yellow, blue at 1.3 cyan plus 1.25 magenta, and three color black at 1.3 cyan plus 1.35 magenta plus 0.75 yellow. The A* and B* measurements are depicted in FIG. 20 as:
1) Yellow 122;
2) Red Overprint 128;
3) Magenta 134;
4) Blue Overprint 140;
5) Cyan 146; and
6) Green Overprint 152.

Without the original bitmaps a thin white-space error was visible between colors.

Using the invention with the original bitmaps eliminated the white-space error. Imaging as follows: the original cyan bitmap at 1.3 cyan, the original magenta bitmap at 1.25 magenta, the original yellow bitmap at 0.75 yellow, the pure cyan bitmap is not used, the pure magenta at 0.2 magenta, the pure yellow at 0.15 magenta and 0.1 yellow, the red at 0.25 magenta, the green at 0.15 magenta and 0.1 yellow, the blue is not used, and the three color black at 0.1 magenta. The A* and B* measurements are depicted in FIG. 20 as:
1) Yellow 124;
2) Red Overprint 130;
3) Magenta 136;
4) Blue Overprint 142;
5) Cyan 148; and
6) Green Overprint 154.

The yellow tints 158 and 156 in FIG. 20 show that the tint scale composed of the modified colors is also affected by the invention.

A further embodiment of the invention calculates a dark red bitmap by the logical AND of the inverse cyan bitmap 2, the magenta bitmap 4, the yellow bitmap 6, and the black bitmap 8. This embodiment images the dark red bitmap using a dark red recipe consisting of one or more of the set of (cyan, magenta, yellow, and black densities).

A further embodiment of the invention calculates a dark green bitmap by the logical AND of the cyan bitmap 2, the inverse magenta bitmap 4, the yellow bitmap 6, and the black bitmap 8. This embodiment images the dark green bitmap using a dark green recipe consisting of one or more of the set of (cyan, magenta, yellow, and black densities).

A further embodiment of the invention calculates a dark blue bitmap by the logical AND of the cyan bitmap 2, the magenta bitmap 4, the inverse yellow bitmap 6, and the black bitmap 8. This embodiment images the dark blue bitmap using a dark blue recipe consisting of one or more of the set of (cyan, magenta, yellow, and black densities).

Figure 9:
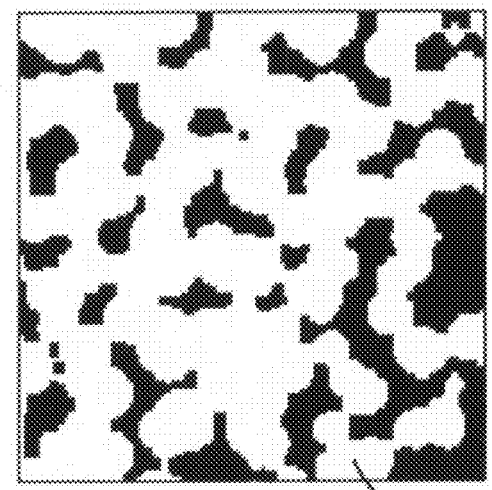
FIG. 9 is a paper bitmap.

A further embodiment of the invention calculates a paper bitmap 34 as shown in FIG. 9 by the logical AND of the inverse cyan bitmap 2, the inverse magenta bitmap 4, the inverse yellow bitmap 6, and the inverse black bitmap 8. This embodiment images the paper bitmap using a paper recipe consisting of one or more of the set of (cyan, magenta, yellow, and black densities).

Another embodiment of the invention in combination with commonly-assigned U.S. patent application Ser. No. 10/355,932, filed Jan. 31, 2003, entitled APPARATUS FOR PRINTING A MULTIBIT IMAGE, by Sanger et al. combines the cyan, magenta, yellow, and black bitmap separations into one 4-bit image and images each colorant in a single pass using multiple exposure levels to adjust the color of the proof.

Figure 21:
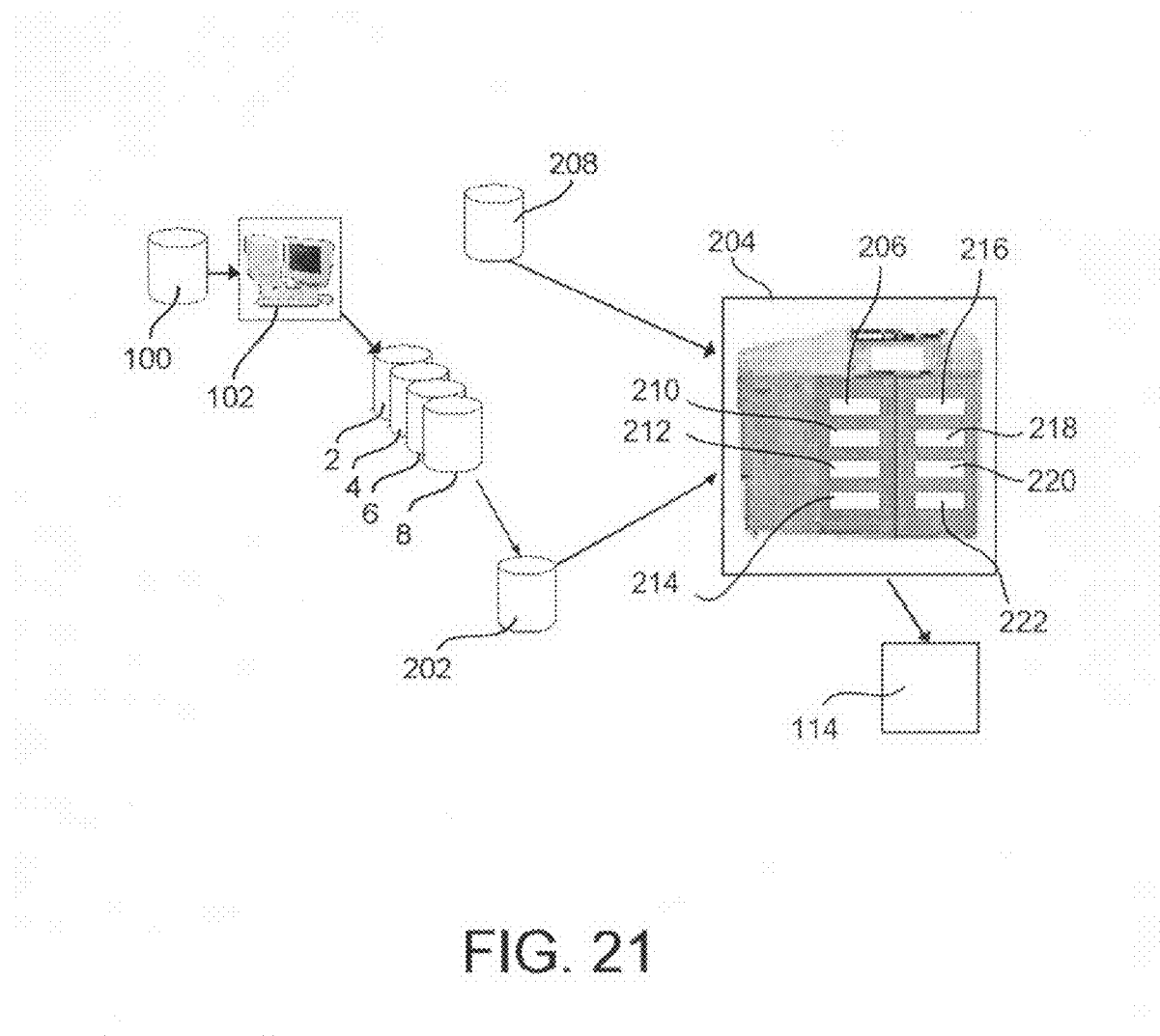
FIG. 21 is an embodiment of the invention.

The invention is a method for adjusting the printed color of halftone dot 10 in a color proof. The invention is shown in FIG. 21.

The invention begins by combining a cyan binary bit map 2, a magenta binary bitmap 4 a yellow binary bitmap 6 and a black binary bitmap 8. The cyan, magenta, yellow, or black bitmap can be an images, text, bar codes, and linework.

The combination of the bitmaps forms a 4-bit per pixel image 202. The method continues by using the 4-bit per pixel image 202 to identify the following colors: red 10, cyan 2, green 12, magenta 4, blue 14, yellow 6 and three color black or neutral 16. Alternative colors include pure cyan 26, pure magenta 28, pure yellow 30, pure black 32 dark cyan 20, dark magenta 22, dark yellow 24, four color neutral 18, and combinations thereof.

The simplest embodiment creates the 4-bit per pixel image 202 using the cyan bitmap 2 for bit 0, the magenta bitmap 4 for bit 1, the yellow bitmap 6 for bit 2, and the black bitmap 8 for bit 3. This results in the color mapping of Table 1.

TABLE 1

Color mapping for 4-bit image.

| Bit 3 = black bitmap (8) | Bit 2 = yellow bitmap (6) | Bit 1 = magenta bitmap (4) | Bit 0 = cyan bitmap (2) | Color |
|---|---|---|---|---|
| 0 | 0 | 0 | 0 | Paper (34) |
| 0 | 0 | 0 | 1 | Pure Cyan (26) |
| 0 | 0 | 1 | 0 | Pure Magenta (28) |
| 0 | 0 | 1 | 1 | Blue (14) |
| 0 | 1 | 0 | 0 | Pure Yellow (30) |
| 0 | 1 | 0 | 1 | Green (12) |
| 0 | 1 | 1 | 0 | Red (10) |
| 0 | 1 | 1 | 1 | Three Color Black (16) |
| 1 | 0 | 0 | 0 | Pure Black (32) |
| 1 | 0 | 0 | 1 | Dark Cyan (20) |
| 1 | 0 | 1 | 0 | Dark Magenta (22) |
| 1 | 0 | 1 | 1 | Dark Blue |
| 1 | 1 | 0 | 0 | Dark Yellow (24) |
| 1 | 1 | 0 | 1 | Dark Green |
| 1 | 1 | 1 | 0 | Dark Red |
| 1 | 1 | 1 | 1 | Four Color Black (18) |

For each primary color in sequence, the method involves numerous steps. The first step entails loading a color donor 206. In the simplest embodiment the color donor may be cyan, magenta, yellow, or black.

Second, the densities 208 for the loaded color donor is set for the for the amount of color donor in each identified color. For instance when imaging cyan donor the densities for the cyan in paper 34, cyan in pure cyan 26, cyan in pure magenta 28, cyan in blue 14, cyan in pure yellow 30, cyan in green 12, cyan in red 10, cyan in three color black 16, cyan in pure black 32, cyan in dark cyan 20, cyan in dark magenta 22, cyan in dark blue, cyan in dark yellow 24, cyan in dark green, cyan in dark red, and cyan in four color black 18. When imaging magenta the densities 208 are set for the amount of magenta in each identified color.

Next, the method involves calculating a set of exposures 210 needed to image each density 208 and, then, setting a maximum exposure level 212. The maximum exposure level 212 is a number greater than or equal to the maximum of the set of exposures 210.

The pulse width modulation levels 212 can be calculated by dividing each exposure in the set of exposures 210 by the set maximum exposure level 212.

Figure 22:
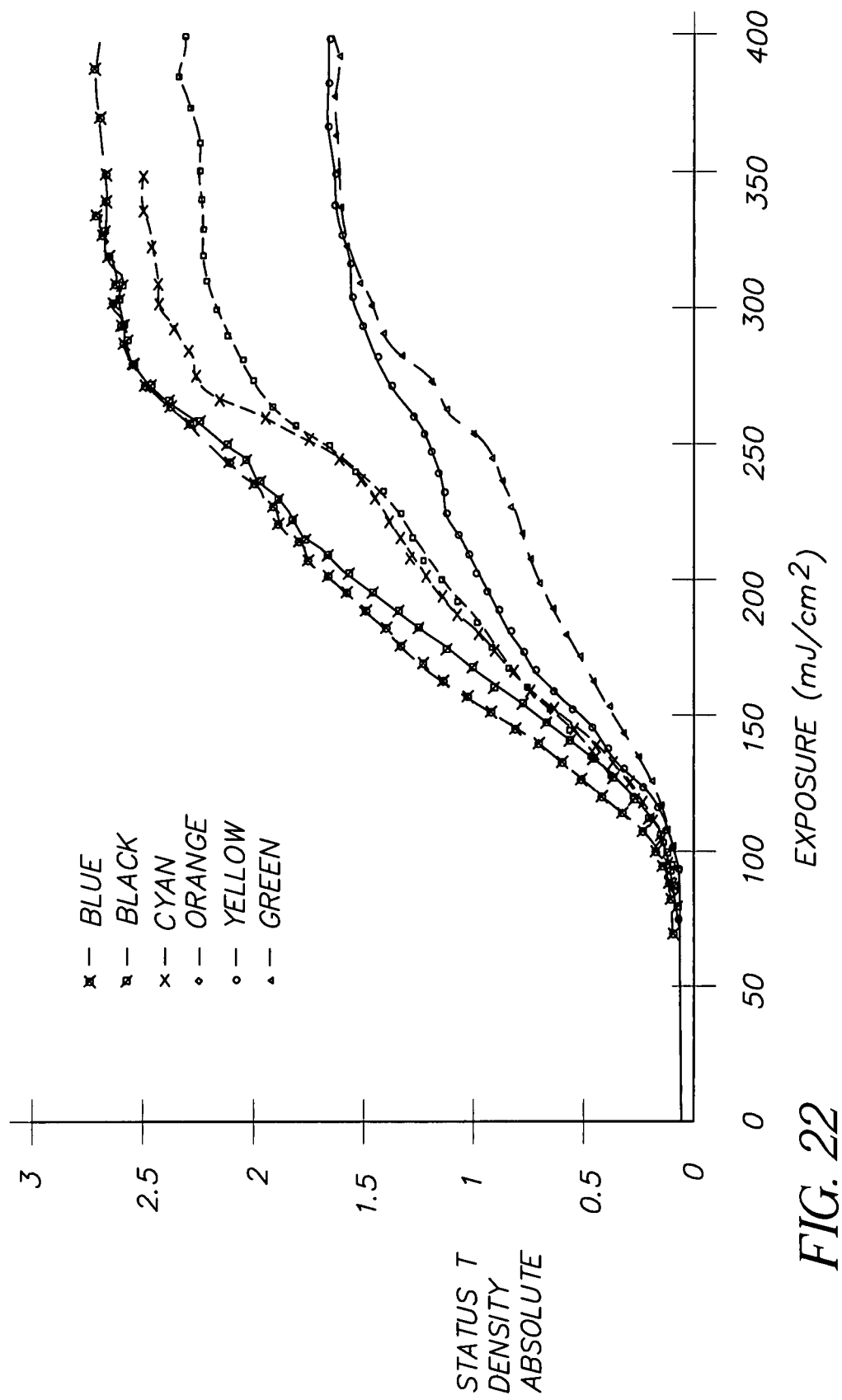
FIG. 22 is a sensitometric curve showing printed density verses exposure.

Since calculations are involved in the method, the invention contemplates that the calculated exposure can be calculated using a curve of density versus exposure, as shown in FIG. 22. The maximum exposure level 212 can range from 50 mJ/cm² to 1000 mJ/cm². Pulse width modulation levels 214 are calculated by dividing each exposure in the set of exposures 210 by the maximum exposure level 212. Each pulse width modulation level represents the fraction of the maximum exposure needed to obtain one exposure from the list of exposures. The pulse width modulation level may be implemented in printer 204 by turning the pixel within the 4-bit image "on" for a percentage of a whole pixel time. Nominally to obtain a pulse width modulation level of 50% the pixel would be turned on for ½ of the pixel time. Pixel time is the time devoted to image a single pixel in the "p" bit image.

For a printer 204 with media mounted to a drum with a circumference "C" revolving at a drum speed "S" and writing resolution "R" the pixel time 216 is calculated using Equation 1. For example, a printer having a drum with a circumference of 58.75 cm/rev, revolving at a speed of 1800 Rev/min, and a writing resolution of 2540 dots/inch, has a pixel time (216) of {2.54 cm/in×60 sec/min×1E9 nsec/sec/ [58.75 cm/rev×1800 rev/min×2540 dpi]}=567.4 nsec. To expose a pixel at a pulse width modulation level of 50% the pixel would be turned on for 283.7 nsec out of 567.4 nsec.

Equation 1. Calculation of Pixel Time $$PixelTime = \frac{1}{Circumference \times WritingResolution \times DrumSpeed} \qquad \text{Equation 1}$$

The printer described in U.S. patent application Ser. No. 10/355,932, filed Jan. 31, 2003, entitled APPARATUS FOR PRINTING A MULTIBIT IMAGE, by Sanger et al. quantizes the pulse width modulation levels 214 in $\frac{1}{16}^{th}$ pixel time increments. The base duty cycle 218 is the maximum number of $\frac{1}{16}^{th}$ pixel time increments within a pulse width modulation level. To further control the exposure of each pixel in finer increments than $\frac{1}{16}^{th}$ pixel this printer allows the trailing edge of each pulse width modulated pixel to be extended by a trailing edge extension count value, TEE count 220. Each TEE count increment extends the trailing edge of the pulse by a fixed amount called TEE time. TEE increments between 0.5 and 3 sec provide a fine resolution between base duty cycles of $\frac{1}{16}^{th}$ pixels.

Figure 23A:
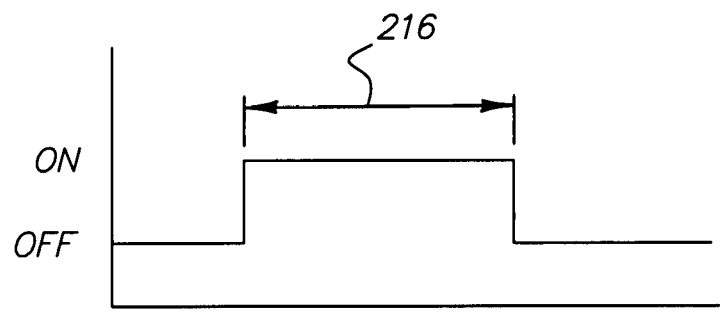
FIG. 23*a* is a timing diagram depicting a pixel time.
Figure 23B:
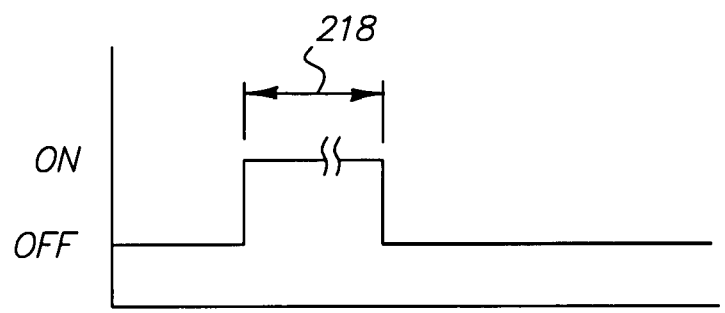
FIG. 23*b* is a timing diagram depicting a base duty cycle and an off time.
Figure 23C:
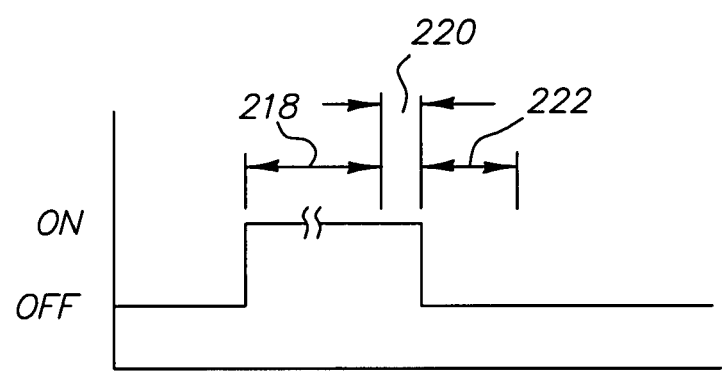
FIG. 23*c* is a timing diagram depicting a base duty cycle with trailing edge extension and an off time.

FIG. 23a, 23b, and 23c show a series of pulses which representing "on" commands to the printer. FIG. 23a shows one pulse representing the time for a single pixel exposure. FIG. 23b shows one pulse that is on for a base duty cycle 218, which is a multiple of $\frac{1}{16}^{th}$ pixels. FIG. 23c shows the same pulse with the trailing edge extended by a TEE count 220. The pulse width modulation level for the pixel shown in FIG. 23a is 100%. The pulse width modulation level for the pixel shown in FIG. 23b where the number of $\frac{1}{16}^{th}$ pixels is 8 would be 50%. The base duty cycle 218 for FIG. 23b where the number of $\frac{1}{16}^{th}$ pixels is 8 is also 50%. The pulse width modulation level for the pixel shown in FIG. 23c, where the number of $\frac{1}{16}^{th}$ pixels is 8, the TEE count is 2, the TEE time is 1.89 nsec per count, and the pixel time is 567.4 nsec, is 50% plus 1.89 nsec×2/567.4 nsec 50.667%.

A printer with a quantized base duty cycle having $\frac{1}{16}^{th}$ pixel increments may result in slightly more or less exposure at each base duty cycle setting. To account for inaccuracies in setting exposure, densities are printed using different base duty cycles and maximum exposures. Then the equivalent 100% exposure to achieve each measured density is determined using a sensitometric response such as that shown in FIG. 22. Then the equivalent pulse width modulation level is determined by dividing each maximum exposure by its 100% exposure. Lastly a base duty cycle slope (mBaseDC) and pulse width modulation intercept (PWMIntercept) is calculated relating base duty cycles to pulse width modulation levels (PWMLevel). This results in equation 2.

Equation 2. Calibrated pulse width modulation levels as a function of base duty cycles.

PWMLevel=mBaseDC×BaseDC+PWMIntercept

A printer with trailing edge extension counts may result in slightly more or less exposure at each trailing edge extension count setting. To account for inaccuracies in setting exposure, densities are printed using different base duty cycles, TEE counts, and maximum exposures. Then the equivalent 100% exposure to achieve each measured density is determined using a sensitometric response such as that shown in FIG. 22. Then the equivalent pulse width modulation level is determined by dividing each maximum exposure by its 100% exposure. Lastly a base duty cycle slope (mBaseDC), a TEE Count slope (mTEECount), and pulse width modulation intercept (PWMIntercept) is calculated relating base duty cycles and TEE Counts to pulse width modulation levels (PWMLevel). Equation 3 calculates the calibrated pulse width modulation level as a function of base duty cycle and TEE Count.

Equation 3. Calibrated pulse width modulation levels as a function of base duty cycles and TEE Counts.

PWMLevel=mBaseDC×BaseDC+mTEECount×TEECount+PWMIntercept

It is anticipated that if more accuracy in setting exposure is required that more complicated models for calibrating the pulse width modulation level may be created. These models may take into account the color, the drum speed, the power of the exposing device, and the interactions between one or more of the model's factors.

Another problem that may arise with the printer 204 is that when the pixel is turned off for a short amount of time the response may be nonlinear. The maximum exposure is adjusted to compensate for this effect. The off time 222 is calculated using Equation 4. An off time of 0 nsec is obtained at a base duty cycle of 100%. The printer will be linear at 100% duty cycle. An off time less than a lower limit, for example 0 to 45 nsec, may result in the printer barely changing the net exposure for the given pixel.

Equation 4. Calculation of Off Time.

OffTime=(1−PWMLevel)×PixelTime

Given the set of exposures 210 set the maximum exposure level 212 to the maximum of the set of exposures 210. From the maximum exposure level 212 and the printer 204 calculate the drum speed using equation 5. Calculate the pixel time using Equation 1. Calculate the pulse width modulation levels 214 by dividing the set of exposures 210 by the maximum exposure level 212. For each pulse width modulation level calculate the off time using Equation 4. If there exists an off time less than the lower limit and not equal to zero then set the maximum exposure 212 to the maximum exposure of the set of exposures 210 times the pixel time calculated above divided by the quantity, the pixel time calculated above less the minimum pixel time required.

Equation 4. Calculation of Off Time $$DrumSpeed = \frac{Power \times WritingResolution}{Circumference \times Exposure} \quad \text{Equation 5}$$

The invention is also the color proof 114 produced by the methods described herein. A color proof is created using this method by imaging multiple bitmaps of each of one or more primary colors in a single pass per primary color. Primary colors may be any of the colors available within the printer including cyan, magenta, yellow, black, orange, green, blue, white, and metallic.

Finally for each donor color, the method includes calculating pulse width modulation levels 214 for the set of exposures 210 using the set maximum exposure level 212 and, then, printing the color donor 206 at the set maximum exposure level 212 using the pulse width modulation levels 212 for each pixel of the 4-bit per pixel image 202 in a single pass.

The density for the loaded color donor can be set to be equivalent to that of a press sheet, can be set to be equivalent to that of a color proof, or can be set to be equivalent to that of an ink jet print.

PARTS LIST

2. Cyan bitmap
4. Magenta bitmap
6. Yellow bitmap
8. Black bitmap
10. Red bitmap
12. Green bitmap
14. Blue bitmap
16. Three color black or neutral bitmap
18. Four color black bitmap
20. Dark cyan bitmap
22. Dark magenta bitmap
24. Dark yellow bitmap
26. Pure cyan bitmap
28. Pure magenta bitmap
30. Pure yellow bitmap
32. Pure black bitmap
34. Paper bitmap
100. Disk
102. Computer
104. Computer
108. Disk
110. Computer
112. Digital halftone color proof
114. Halftone proof
120. Yellow
122. Yellow
124. Yellow
126. Red overprint
128. Red overprint
130. Red overprint
132. Magenta
134. Magenta
136. Magenta
138. Blue overprint
140. Blue overprint
142. Blue overprint
144. Cyan
146. Cyan
148. Cyan
150. Green overprint
152. Green overprint
154. Green overprint
156. Yellow tint
158. Yellow tint
202. 4-bit image pixel
204. Printer
206. Color donor
208. Densities
210. Set of exposures 212. Maximum exposure level
214. Pulse width modulation level
216. Pixel time
218. Base duty cycle
220. TEE count
222. Off time

What is claimed is:

1. A method for adjusting a color in a color proof printed with primary colors cyan, magenta, yellow, and black:
   a) combining a cyan binary bit map, a magenta binary bitmap, a yellow binary bitmap, and a black binary bitmap to form an image comprising 4-bits per pixel;
   b) using said 4-bit per pixel image to identify colors selected from a group comprising red, cyan, green, magenta blue, yellow, and neutral; and
   c) for each of said primary colors, perform the steps in sequence:
      1) loading a color donor selected from a group comprised of said primary colors;
      2) setting a density for said loaded color donor for an amount of color donor in each of said colors in said group;
      3) calculating a set of exposures needed to image said densities;
      4) setting a maximum exposure level which is a number greater than or equal to a maximum of said set of exposures;
      5) calculating a pulse width modulation level for said set of exposures using said set maximum exposure level; and
      6) printing said color donor at said set maximum exposure level using said pulse width modulation level for each level of said 4-bit per pixel image in a single pass.

2. The method of claim 1 wherein the group of colors include a member selected from: pure cyan, pure magenta, pure yellow, pure black, dark cyan, dark magenta, dark yellow, three color neutral, four color neutral, and combinations thereof.

3. The method of claim 1 further comprising the step of calculating a base duty cycle and a TEE count for each pulse width modulation level.

4. The method of claim 1 wherein said cyan binary bitmap, magenta binary bitmap, yellow binary bitmap and black bitmaps each can comprise: images, text, bar codes, or linework, or a combination.

5. The method of claim 1 wherein said calculated set of exposures can be calculated using a curve of density versus exposure.

6. The method of claim 1 wherein said maximum exposure level can range from 50 mJ/cm$^2$ to 1000 mJ/cm$^2$.

7. The method of claim 1 wherein said pulse width modulation level is calculated by dividing each exposure in said set of exposures by set maximum exposure level.

8. The method of claim 1 further comprising the step of setting said maximum exposure level such that none of said exposures are within an "off" time.

9. The method of claim 8 wherein said "off time" is a member of the group consisting of greater than 40 nanoseconds, equal to 40 nanoseconds, and zero.

10. The method of claim 1 wherein said density for said loaded color donor is set to be equivalent to that of a press sheet.

11. The method of claim 1 wherein said density for said loaded color donor is set to be equivalent to that of said color proof.

12. The method of claim 1, wherein said density for said loaded color donor is set to be equivalent to that of an ink jet print.

13. A method for adjusting a color in a color proof printed on a printer with primary colors from primary color bitmaps:
   a) selecting said primary colors from colorants loaded in said printer;
   b) combining n primary color binary bit maps to form an n-bit per pixel image; and
   c) printing said n-bit per pixel image with a single exposure for each of said colorants.

14. A method as in claim 13 wherein said colorants are selected from a group comprising cyan, magenta, yellow, black, orange, green, red, blue, pink, white, silver, and gold.

15. A method as in claim 13 wherein a variable amount of said colorants are printed.

* * * * *